US011799877B2

(12) United States Patent
Becker et al.

(10) Patent No.: US 11,799,877 B2
(45) Date of Patent: Oct. 24, 2023

(54) SUPERVISORY CONTROL AND DATA ACQUISITION

(71) Applicant: Palantir Technologies Inc., Palo Alto, CA (US)

(72) Inventors: Nomi Becker, Smithtown, NY (US); Isaac Smitley, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 892 days.

(21) Appl. No.: 16/713,419

(22) Filed: Dec. 13, 2019

(65) Prior Publication Data

US 2020/0120116 A1    Apr. 16, 2020

Related U.S. Application Data

(63) Continuation of application No. 16/359,021, filed on Mar. 20, 2019, now Pat. No. 10,567,404, which is a continuation of application No. 16/042,702, filed on Jul. 23, 2018, now Pat. No. 10,298,603, which is a continuation of application No. 15/434,930, filed on Feb. 16, 2017, now Pat. No. 10,084,802.

(60) Provisional application No. 62/352,933, filed on Jun. 21, 2016.

(51) Int. Cl.
*H04L 9/40* (2022.01)

(52) U.S. Cl.
CPC ...... *H04L 63/1416* (2013.01); *H04L 63/0227* (2013.01)

(58) Field of Classification Search
CPC ............. H04L 63/1416; H04L 63/0227; H04L 63/1425; H04L 67/535; H04L 43/045; G06F 11/3438; G06F 11/3476; G06F 17/40; G06F 21/566
See application file for complete search history.

(56) References Cited

U.S. PATENT DOCUMENTS

| | | | | |
|---|---|---|---|---|
| 9,154,516 B1 * | 10/2015 | Vaystikh | ............. | H04L 63/1425 |
| 9,516,053 B1 * | 12/2016 | Muddu | ................. | G06F 3/0484 |
| 9,600,659 B1 | 3/2017 | Bird et al. | | |
| 9,607,507 B1 * | 3/2017 | McClintock | ........... | G08C 17/04 |
| 10,567,404 B2 | 2/2020 | Becker et al. | | |

(Continued)

OTHER PUBLICATIONS

"U.S. Appl. No. 15/434,930, Non Final Office Action dated Dec. 29, 2017", 10 pgs.
"U.S. Appl. No. 15/434,930, Notice of Allowance dated May 23, 2018", 8 pgs.
"U.S. Appl. No. 16/042,702, Notice of Allowance dated Jan. 7, 2019", 8 pgs.

(Continued)

*Primary Examiner* — Techane Gergiso
(74) *Attorney, Agent, or Firm* — Faegre Drinker Biddle & Reath LLP

(57) ABSTRACT

Aspects of the present disclosure relate to computer system security. A machine accesses a set of records corresponding to a set of users having access to a computer system. The machine stores, for each user in the set of users, a baseline profile representing baseline activity of the user with respect to a set of data sources of the computer system. The machine monitors activity of the set of users with respect to the set of data sources. The machine determines, based on monitoring the activity of the set of users, that a user action of a specified user, with respect to one or more data sources from the set of data sources, is anomalous relative to the baseline profile of the specified user. The machine provides a digital transmission representing the anomalous user action.

14 Claims, 5 Drawing Sheets

(56) References Cited

U.S. PATENT DOCUMENTS

| | | | |
|---|---|---|---|
| 2009/0019318 A1* | 1/2009 | Cochrane | G06F 11/3452 714/47.2 |
| 2009/0319783 A1 | 12/2009 | Thornton et al. | |
| 2010/0046393 A1 | 2/2010 | Knapp et al. | |
| 2015/0180894 A1* | 6/2015 | Sadovsky | H04W 12/12 726/22 |
| 2015/0195300 A1 | 7/2015 | Adjaoute | |
| 2015/0319185 A1* | 11/2015 | Kirti | H04L 63/1416 726/23 |
| 2016/0080406 A1 | 3/2016 | Sadovsky et al. | |
| 2016/0173511 A1* | 6/2016 | Bratspiess | H04L 63/1425 726/23 |
| 2016/0301707 A1* | 10/2016 | Cheng | H04L 67/12 |
| 2017/0013003 A1* | 1/2017 | Samuni | G06F 11/3438 |
| 2017/0126821 A1* | 5/2017 | Bostick | H04L 67/535 |
| 2018/0167402 A1* | 6/2018 | Scheidler | G06N 20/00 |
| 2018/0351973 A1 | 12/2018 | Becker et al. | |
| 2019/0230102 A1 | 7/2019 | Becker et al. | |

OTHER PUBLICATIONS

"U.S. Appl. No. 16/359,021, Corrected Notice of Allowability dated Dec. 19, 2019", 3 pgs.

"U.S. Appl. No. 16/359,021, Examiner Interview Summary dated Aug. 6, 2019", 3 pgs.

"U.S. Appl. No. 16/359,021, Non Final Office Action dated Jun. 28, 2019", 12 pgs.

"U.S. Appl. No. 16/359,021, Notice of Allowance dated Oct. 9, 2019", 7 pgs.

"U.S. Appl. No. 16/359,021, Preliminary Amendment filed Apr. 10, 2019", 8 pgs.

"U.S. Appl. No. 16/359,021, Response filed Sep. 16, 2019 to Non-Final Office Action dated Jun. 28, 2019", 13 pgs.

U.S. Appl. No. 15/434,930 U.S. Pat. No. 10,084,802, filed Feb. 16, 2017, Supervisory Control and Data Acquisition.

U.S. Appl. No. 16/042,702 U.S. Pat. No. 10,298,603, filed Jul. 23, 2018, Supervisory Control and Data Acquisition.

U.S. Appl. No. 16/359,021 U.S. Pat. No. 10,567,404, filed Mar. 20, 2019, Supervisory Control and Data Acquisition.

* cited by examiner

| Time | Action | User | Consistent with baseline |
|---|---|---|---|
| 2016/06/10 10:30 | Data transmission | John ABC | Yes |
| 2016/06/10 10:12 | Machine access | Jane DEF | Yes |
| 2016/06/09 23:44 | Data transmission | Mark GHI | Yes |
| 2016/06/09 13:21 | Machine access | Cindy JKL | Yes |

FIG. 4

Activity Details

Time: 2016/06/09 23:44 — 510

Action: Data transmission — 520
    2123 KB
    From IP 1.2.3.4
    To IP 5.6.7.8

User: Mark GHI — 530

Inconsistent with baseline because
Time: 2016/06/09 23:44 is inconsistent — 540
with the baseline Time: 09:00-17:00

Geography: Madrid, Spain is inconsistent
with baseline Geography: New York City,
NY, USA

FIG. 5

SUPERVISORY CONTROL AND DATA ACQUISITION

PRIORITY CLAIM

This application is a continuation of and claims priority to U.S. patent application Ser. No. 16/359,021, filed on Mar. 20, 2019, which is a continuation of and claims priority to U.S. patent application Ser. No. 16/042,702, filed on Jul. 23, 2018, which is a continuation of and claims priority to U.S. patent application Ser. No. 15/434,930, filed on Feb. 16, 2017, entitled "SUPERVISORY CONTROL AND DATA ACQUISITION," which claims benefit to U.S. Provisional Patent Application No. 62/352,933, filed on Jun. 21, 2016, entitled "SUPERVISORY CONTROL AND DATA ACQUISITION," all of which are incorporated herein by reference.

TECHNICAL FIELD

The subject matter disclosed herein relates to computer system security. In particular, example embodiments may relate to control and monitoring of user activity at computer systems to increase security.

BACKGROUND

Some computer systems are insecure by design and, thus, vulnerable to attacks. Reprogramming or completely updating these systems may be prohibitively expensive. At the same time, better security may be desirable to protect from attackers. As the foregoing illustrates, techniques for improving computer system security may be desirable.

BRIEF DESCRIPTION OF THE DRAWINGS

Various ones of the appended drawings merely illustrate example embodiments of the present inventive subject matter and cannot be considered as limiting its scope.

FIG. 4 is an example of a dashboard, according to some embodiments.

FIG. 5 is an example of a detailed view of a user activity, according to some embodiments.

DETAILED DESCRIPTION

Figure 1:
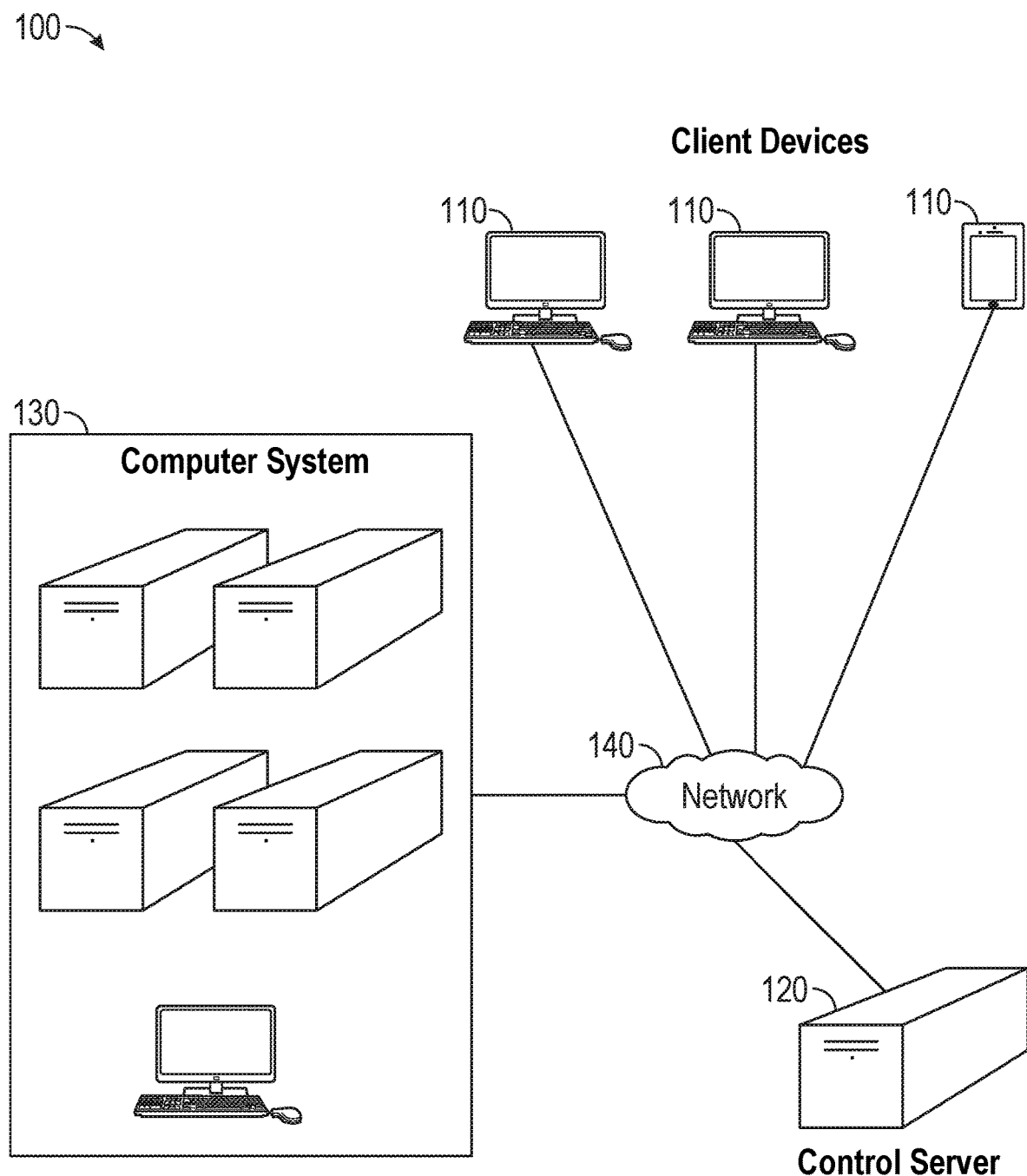
FIG. 1 is a diagram of an example system in which supervisory control and data acquisition is implemented, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, some computer systems are insecure by design and, thus, vulnerable to attacks. Update cycles for these computer systems are measured in years and, oftentimes, do not follow technical best practices. Furthermore, updating operating system or similar software in a large computer system is prohibitively expensive and takes up much time of information technology (IT) specialists. In some cases, a security system for a computer system resides at a desktop of an IT specialist, which may itself be vulnerable to attacks.

Aspects of the subject technology may be implemented in any computer system that requires security. Some implementations of the subject technology are useful in critical infrastructure settings, such as machines responsible for water quality, oil and natural gas pipelines, nuclear control, air traffic control, communications routing, and manufacturing automated control.

Aspects of the subject technology are directed to improving computer system security. A control server accesses a set of users (e.g., system administrators) having access to a computer system. The control server stores, for each user in the set of users, a baseline profile representing baseline activity of the user with respect to a set of data sources of the computer system. The baseline profiles are generated during a time when there are no attacks on the computer system and the users use the computer system in typical ways and in accordance with their roles in a business (or other enterprise, organization, government or non-government agency, and the like) associated with the computer system.

According to some examples, the data sources include one or more of: a packet log of packets travelling between the computer system and an external network, a driver log of the computer system, a secure socket layer (SSL) certificate authority (CA) of the computer system, a programmable logic controller (PLC) of the computer system, a simple mail transfer protocol (SMTP) log of the computer system, a web access log of the computer system, service repos of the computer system, network drives of the computer system, workstation performance logs of the computer system, and workstation network traffic of the computer system. The data sources listed above are examples only. In some cases, other data sources different from or in addition to those listed above may be used with the subject technology.

After creating the baseline profiles for the users, the control server monitors activity of the set of users with respect to the set of data sources. The control server determines, based on the monitoring, that a user action taken by a specified user, with respect to a data source, is anomalous relative to the baseline profile of the specified user. The control server provides a digital transmission (e.g., an urgent message to a high level system administrator) representing the anomalous user action. A machine or human receiving the digital transmission may then take an appropriate remedial action in response to the anomalous user action.

In summary, aspects of the subject technology include establishing a "normal" environment baseline, and then looking for "strangeness" relative to the baseline. When strangeness is detected, remedial action may be taken. Some aspects of the subject technology may include: analyzing network traffic and detect failures in the air gap, showing spear fishing attempts against persons or machines who have access to a personnel security clearance (PCL) source (possibly the first stage of an attack), examining the control stations for driver installations, universal serial bus (USB) storage insertions, new trusted certificates, atypical performance profiles, and anti-virus logs, and analyzing supervisory control and data acquisition logs for known industrial incidents to determine if a current failure is similar to a known industrial incident. Some aspects of the subject technology are directed to looking at targeted supervisory control and data acquisition attacks, determining if the schemes used in the attacks are applicable to data sources of a computer system, and creating observability tools to enable IT specialists of the computer system to take action before the computer system fails.

FIG. 1 is a diagram of an example system 100 in which supervisory control and data acquisition is implemented, according to some embodiments. As shown, the system 100 includes client devices 30, a control server 120, and a computer system 130 connected to one another via a network 140. The network 140 may include one or more of the Internet, an intranet, a local area network, a wide area network (WAN), a cellular network, a WiFi network, a virtual private network (VPN), a public network, a wired network, a wireless network, etc.

The computer system 130 may be associated with a business (or other enterprise, organization, government or non-government agency, and the like) and may include data and access to or control over resources that the business wishes to keep secure. The computer system 130 may include multiple servers or client devices and may include one or more internal networks. The computer system 130 may include only physical machines, only virtual machines, or a combination of physical and virtual machines.

The client device(s) 30 may include one or more of a laptop computer, a desktop computer, a mobile phone, a tablet computer, a personal digital assistant (PDA), a digital music player, a smart watch, and the like. Some client device(s) may belong to IT specialists and may include application(s) for communicating with the computer system 130 and the control server 120. Some client device(s) 30 may belong to hackers or attackers who attempt to compromise the computer system 130.

The control server 120 is configured to monitor user activity at the computer system 130, detect anomalous activity, and notify system administrators or IT specialists of the anomalous activity. More details of the operation of the control server 120 are provided in conjunction with FIG. 2. While a single control server 120 is illustrated in FIG. 1, the control server 120 may be implemented as a single physical machine, multiple physical machines, or a virtual machine.

As used herein, the term "configured" encompasses its plain and ordinary meaning. In some examples, a machine (e.g., control server 120) is configured to carry out operation(s) by storing code for the operation(s) in memory. Processing hardware (e.g., one or more processors) carries out the operations by accessing the appropriate locations in the memory. Alternatively, the machine is configured to carry out the operation(s) by having the operation(s) hard-wired in the processing hardware.

Figure 2:
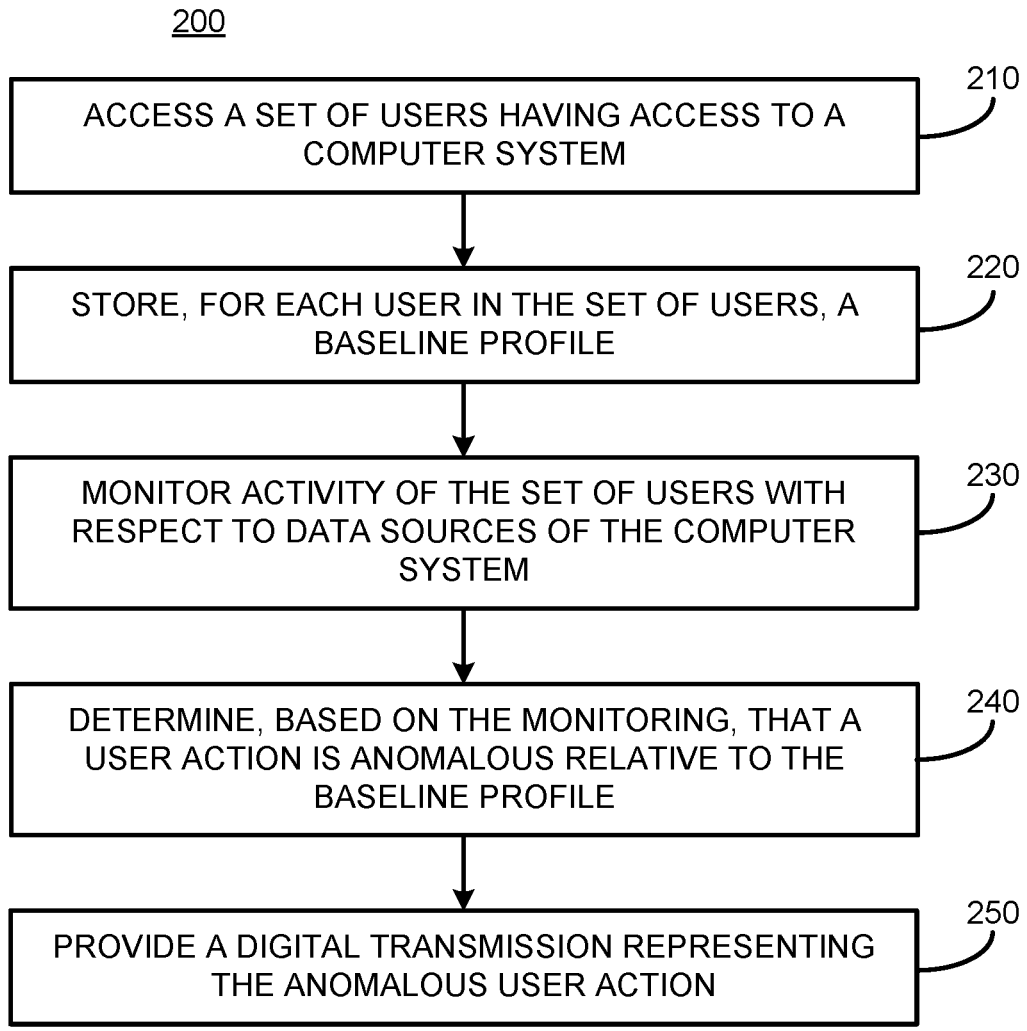
FIG. 2 is a flowchart illustrating an example method for supervisory control and data acquisition, according to some embodiments.

FIG. 2 is a flowchart illustrating an example method 200 for supervisory control and data acquisition, according to some embodiments.

The method 200 begins at operation 210, where the control server 120 accesses a set of users having access to the computer system 130. The set of users may be stored at the control server 120 or at a data repository coupled to the control server 120. The set of users having access to the computer system 130 include system administrators or IT specialists of the computer system 130.

At operation 220, the control server 120 stores, for each user in the set of users, a baseline profile. The baseline profile represents activity of the user with respect to a set of data sources at the computer system 130. The baseline profile is stored at the control server 120 or at the data repository coupled to the control server 120. The baseline profiles are generated during a time when there are no attacks on the computer system 130 and the users use the computer system 130 in typical (e.g., routine) ways and in accordance with their roles in a business (or other enterprise, organization, government or non-government agency, and the like) associated with the computer system 130.

The set of data sources of the computer system 130 may include one or more of: a packet log of packets travelling between the computer system and an external network, a driver log of the computer system, a secure socket layer (SSL) certificate authority (CA) of the computer system, a programmable logic controller (PLC) of the computer system, a simple mail transfer protocol (SMTP) log of the computer system, a web access log of the computer system, service repos of the computer system, network drives of the computer system, workstation performance logs of the computer system, and workstation network traffic of the computer system.

At operation 230, the control server 120 monitors activity of the set of users with respect to the set of data sources of the computer system 130. In some cases, the control server 120 imports a current inventory database of the computer system 130 and correlates it with network sources (such as passive layer 2 traffic analysis and traffic logs). The control server also accesses switch and router configurations. Other monitoring techniques may also be used.

At operation 240, the control server 120 determines, based on monitoring (in operation 230) the activity of the set of users, that a user action of a specified user, with respect to one or more data sources from the set of data sources, is anomalous relative to the baseline profile of the specified user. The anomalous user action may include accessing the set of data sources at a time of day different from a time of day for accessing the set of data sources specified in the baseline profile. For example, the anomalous user action may include accessing a data source at 3 AM (New York City time) by a user who typically works, and accesses the data sources, between 9 AM and 5 PM (New York City time). The anomalous user action may include accessing the set of data sources from a geographic location different from a geographic location for accessing the set of data sources specified in the baseline profile. For example, the anomalous user action may include accessing a data source from Madrid, Spain, by a user who typically works in, and accesses data sources from, New York City. The anomalous user action may include modifying, by a specific user, programming at the computer system 130 in a manner inconsistent with the baseline profile of the user. For example, the anomalous user action may include modifying a certificate authority of the computer system 130 by a user who has never modified the certificate authority previously. In some cases, the control server determines whether a user action is anomalous by using a combination of machine learning and displaying data for human analysis. An anomalous user action may include an action that causes traffic or machine behavior that significantly deviates from a previously observed baseline. The machine learning or the human analysis may focus on new devices, times when the new device were inserted into the network, sources of the devices (e.g., physically controlled or in an area with historically poor security), and correlation with outage information.

At operation 250, the control server 120 provides a digital transmission representing the anomalous user action. The digital transmission may be an urgent message (e.g., email message, text message, push notification, pop-up notification, and the like) to a high level system administrator representing the anomalous user action. A machine or human receiving the digital transmission (or, in some cases, the control server 120 itself) may then take an appropriate remedial action in response to the anomalous user action. In some cases, the remedial action includes blocking access, by the specified user, to the computer system 130 in response to determining that the specified user action is the anomalous user action. In some cases, the high level system administrator may contact the specified user to determine whether the anomalous user action was valid (e.g., whether the specified user decided to work at 3 AM or decided to work from Madrid, Spain). In some examples, the digital transmission is presented, at a client device 110, on a dashboard. The dashboard illustrates all recent user actions (e.g., within a threshold time period, such as the last 6 hours, 24 hours, 48 hours, and the like) is color coded to highlight the anomalous user action. After operation 250, the method 200 ends.

Figure 3:
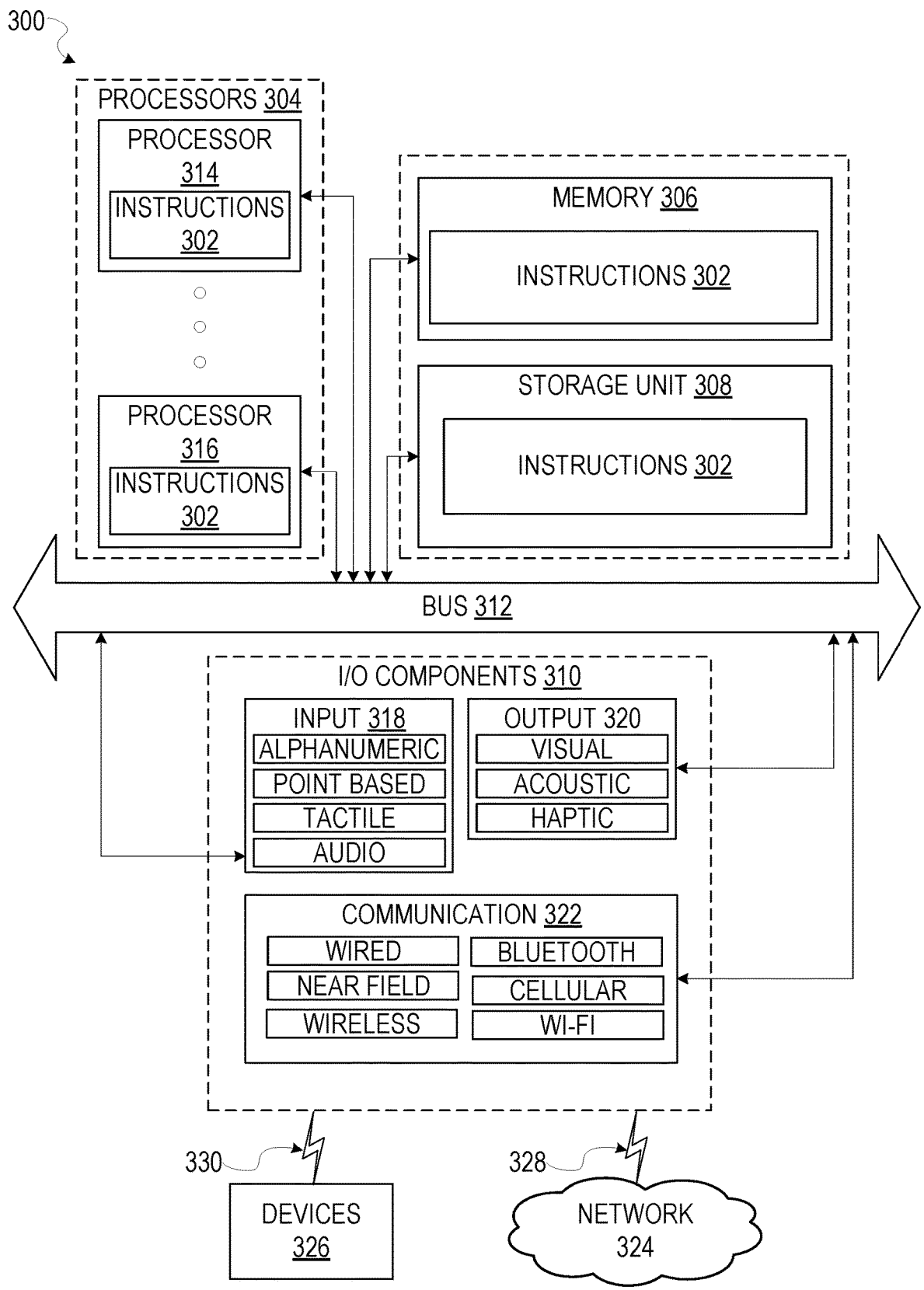
FIG. 3 is a block diagram illustrating components of a machine able to read instructions from a machine-readable medium, according to some embodiments.

FIG. 3 is a block diagram illustrating components of a machine 300, according to some example embodiments, able to read instructions from a machine-readable medium (e.g., a machine-readable storage medium) and perform any one or more of the methodologies discussed herein. The machine 300 may correspond to one or more of the client devices 110, the control server 120, or machine(s) in the computer system 130. Specifically, FIG. 3 shows a diagrammatic representation of the machine 300 in the example form of a system, within which instructions 302 (e.g., software, a program, an application, an applet, an app, a driver, or other executable code) for causing the machine 300 to perform any one or more of the methodologies discussed herein may be executed. For example, the instructions 302 include executable code that causes the machine 300 to execute the method 200. In this way, these instructions transform the general, non-programmed machine into a particular machine programmed to carry out the described and illustrated functions in the manner described herein. The machine 300 may operate as a standalone device or may be coupled (e.g., networked) to other machines.

By way of non-limiting example, the machine 300 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 302, sequentially or otherwise, that specify actions to be taken by machine 300. Further, while only a single machine 300 is illustrated, the term "machine" shall also be taken to include a collection of machines 300 that individually or jointly execute the instructions 302 to perform any one or more of the methodologies discussed herein.

The machine 300 may include processors 304, memory 306, storage unit 308 and I/O components 310, which may be configured to communicate with each other such as via a bus 312. In an example embodiment, the processors 304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 314 and processor 316 that may execute instructions 302. The term "processor" is intended to include multi-core processors that may comprise two or more independent processors (sometimes referred to as "cores") that may execute instructions contemporaneously. Although FIG. 3 shows multiple processors, the machine 300 may include a single processor with a single core, a single processor with multiple cores (e.g., a multi-core process), multiple processors with a single core, multiple processors with multiples cores, or any combination thereof.

The memory 306 (e.g., a main memory or other memory storage) and the storage unit 308 are both accessible to the processors 304 such as via the bus 312. The memory 306 and the storage unit 308 store the instructions 302 embodying any one or more of the methodologies or functions described herein. In some embodiments, the database 36 resides on the storage unit 308. The instructions 302 may also reside, completely or partially, within the memory 306, within the storage unit 308, within at least one of the processors 304 (e.g., within the processor's cache memory), or any suitable combination thereof, during execution thereof by the machine 300. Accordingly, the memory 306, the storage unit 308, and the memory of processors 304 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 302. The term "machine-readable medium" shall also be taken to include any medium, or combination of multiple media, that is capable of storing instructions (e.g., instructions 302) for execution by a machine (e.g., machine 300), such that the instructions, when executed by one or more processors of the machine 300 (e.g., processors 304), cause the machine 300 to perform any one or more of the methodologies described herein (e.g., method 200). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 310 may include a wide variety of components to receive input, provide output, produce output, transmit information, exchange information, capture measurements, and so on. The specific I/O components 310 that are included in a particular machine will depend on the type of machine. For example, portable machines such as mobile phones will likely include a touch input device or other such input mechanisms, while a headless server machine will likely not include such a touch input device. It will be appreciated that the I/O components 310 may include many other components that are not specifically shown in FIG. 3. The I/O components 310 are grouped according to functionality merely for simplifying the following discussion and the grouping is in no way limiting. In various example embodiments, the I/O components 310 may include input components 318 and output components 320. The input components 318 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 310 may include communication components 322 operable to couple the machine 300 to a network 324 or devices 326 via coupling 328 and coupling 330, respectively. For example, the communication components 322 may include a network interface component or other suitable device to interface with the network 324. In further examples, communication components 322 may include wired communication components, wireless communication components, cellular communication components, near field communication (NFC) components, Bluetooth® components (e.g., Bluetooth® Low Energy), WiFi® components, and other communication components to provide communication via other modalities. The devices 326 may be another machine or any of a wide variety of peripheral devices (e.g., a peripheral device coupled via a Universal Serial Bus (USB)).

FIG. 4 is an example of a dashboard 400, according to some embodiments. As shown, the dashboard 400 includes a table with columns for "time," "action," "user," and "consistent with baseline." The dashboard lists four user activities 410, 420, 430, and 440 in the rows. For each user activity 410-440, the time column lists the time when the user activity occurred, the action column lists a brief description of the action that was taken by the user, the user column lists the user's name, and the consistent with baseline column lists "yes" or "no," depending on whether the user's action is consistent with baseline activity for the user. As illustrated in FIG. 4, activities 410, 420, and 440 are consistent with the baseline while activity 430 is inconsistent with the baseline. The activity 430 is highlighted to quickly demonstrate to a user (e.g., an information technology professional) viewing the dashboard 440 that the activity 430 is inconsistent with the baseline. The user may select the activity 430 to access a detailed view of the activity 430. The detailed view is described in conjunction with FIG. 5.

FIG. 5 is an example of a detailed view 500 of a user activity (e.g., the activity 430 of FIG. 4), according to some embodiment. The detailed view 500 may be accessed, for example, by selecting the activity 430 shown in FIG. 4. As shown, the detailed view 500 lists activity details for the user activity. The activity details include the time 510, a detailed description of the action 520 (e.g., amount of data transmitted, from Internet Protocol (IP) address, and to IP address), user information 530 (e.g., the user's name, as shown; in some cases, an identity number or contact information may also be included), and an explanation 540 of why the user activity is inconsistent with the baseline. For example, as shown in FIG. 5, the explanation 540 lists that the user activity is inconsistent with the baseline due to the time and the geography of the user activity. The time is inconstant because the time Jun. 9, 2016 23:44 is inconsistent with the baseline time of 09:00-17:00 when the user usually works. The geography is inconsistent because the user worked from Madrid, Spain, and the user's baseline work location is New York City, N.Y., USA.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A control server comprising:
one or more processors; and
a memory storing instructions which, when executed by the one or more processors, cause the one or more processors to perform operations comprising:
storing, for each user in a set of users having access to a set of data sources, a baseline profile representing baseline activity of the user with respect to a set of data sources;
monitoring activity of the set of users with respect to the set of data sources;
transmitting, to a client device for display thereat, a representation of a plurality of user activities of the set of users, each user activity unit among the plurality of user activities having at least a time, an action type, a user identifier, and whether each user activity unit is consistent with the baseline profile;
determining that a user activity unit from among the representation of the plurality of user activities is inconsistent with the baseline profile of a user from among the set of users, the user activity unit comprising modifying a certificate authority;
determining that the user has never modified the certificate authority previously; and
transmitting, responsive to determining that the user activity unit comprises modifying the certificate authority, and that the user has never modified the certificate authority previously, to the client device for display thereat, a digital transmission that comprises a detailed view of the inconsistent user activity unit, wherein the detailed view includes a display of at least a portion of the baseline profile that corresponds with the inconsistent user activity unit.

2. The control server of claim 1, wherein the action type of the user activity unit is a data transmission, wherein the representation of a plurality of actions indicates that the action type is a data transmission, and wherein the detailed view indicates an amount of data transmitted, a source Internet Protocol (IP) address of the data transmission, and a destination IP address of the data transmission.

3. The control server of claim 1, wherein the set of data sources is hosted at a computer system.

4. The control server of claim 3, wherein the set of data sources comprises one or more of: a packet log of packets travelling between the computer system and an external network, a driver log of the computer system, a secure socket layer (SSL) certificate authority (CA) of the computer system, a programmable logic controller (PLC) of the computer system, a simple mail transfer protocol (SMTP) log of the computer system, a web access log of the computer system, service repos of the computer system, network drives of the computer system, workstation performance logs of the computer system, and workstation network traffic of the computer system.

5. The control server of claim 3, wherein the set of users having access to the set of data sources comprise system administrators of the computer system.

6. A non-transitory machine-readable medium storing instructions which, when executed by one or more processors of a machine, cause the one or more processors to perform operations comprising:
storing, for each user in a set of users having access to a set of data sources, a baseline profile representing baseline activity of the user with respect to a set of data sources;
monitoring activity of the set of users with respect to the set of data sources;
transmitting, to a client device for display thereat, a representation of a plurality of user activities of the set of users, each user activity unit among the plurality of user activities having at least a time, an action type, a user identifier, and whether each user activity unit is consistent with the baseline profile;
determining that a user activity unit from among the representation of the plurality of user activities is inconsistent with the baseline profile of a user from among the set of users, the user activity unit comprising modifying a certificate authority;
determining that the user has never modified the certificate authority previously; and
transmitting, responsive to determining that the user activity unit comprises modifying the certificate authority, and that the user has never modified the certificate authority previously, to the client device for display thereat, a digital transmission that comprises a detailed view of the inconsistent user activity unit, wherein the detailed view includes a display of at least a portion of the baseline profile that corresponds with the inconsistent user activity unit.

7. The machine-readable medium of claim 6, wherein the action type of the user activity unit is a data transmission, wherein the representation of a plurality of actions indicates that the action type is a data transmission, and wherein the detailed view indicates an amount of data transmitted, a source Internet Protocol (IP) address of the data transmission, and a destination IP address of the data transmission.

8. The machine-readable medium of claim 6, wherein the set of data sources is hosted at a computer system.

9. The machine-readable medium of claim 8, wherein the set of data sources comprises one or more of: a packet log of packets travelling between the computer system and an external network, a driver log of the computer system, a secure socket layer (SSL) certificate authority (CA) of the computer system, a programmable logic controller (PLC) of the computer system, a simple mail transfer protocol (SMTP) log of the computer system, a web access log of the computer system, service repos of the computer system, network drives of the computer system, workstation performance logs of the computer system, and workstation network traffic of the computer system.

10. The machine-readable medium of claim 8, wherein the set of users having access to the set of data sources comprise system administrators of the computer system.

11. A method comprising:
storing, for each user in a set of users having access to a set of data sources, a baseline profile representing baseline activity of the user with respect to a set of data sources;
monitoring activity of the set of users with respect to the set of data sources;
transmitting, to a client device for display thereat, a representation of a plurality of user activities of the set of users, each user activity unit among the plurality of user activities having at least a time, an action type, a user identifier, and whether each user activity unit is consistent with the baseline profile,
determining that a user activity unit from among the representation of the plurality of user activities is inconsistent with the baseline profile of a user from among the set of users, the user activity unit comprising modifying a certificate authority;
determining that the user has never modified the certificate authority previously; and
transmitting, responsive to determining that the user activity unit comprises modifying the certificate authority, and that the user has never modified the certificate authority previously, to the client device for display thereat, a digital transmission that comprises a detailed view of the inconsistent user activity unit, wherein the detailed view includes a display of at least a portion of the baseline profile that corresponds with the inconsistent user activity unit.

12. The method of claim 11, wherein the action type of the user activity unit is a data transmission, wherein the representation of a plurality of actions indicates that the action type is a data transmission, and wherein the detailed view indicates an amount of data transmitted, a source Internet Protocol (IP) address of the data transmission, and a destination IP address of the data transmission.

13. The method of claim 11, wherein the set of data sources is hosted at a computer system.

14. The method of claim 13, wherein the set of data sources comprises one or more of: a packet log of packets travelling between the computer system and an external network, a driver log of the computer system, a secure socket layer (SSL) certificate authority (CA) of the computer system, a programmable logic controller (PLC) of the computer system, a simple mail transfer protocol (SMTP) log of the computer system, a web access log of the computer system, service repos of the computer system, network drives of the computer system, workstation performance logs of the computer system, and workstation network traffic of the computer system.

\* \* \* \* \*